April 17, 1962     M. OLLEY     3,029,901
VEHICLE DRUM BRAKE

Filed Sept. 18, 1959     3 Sheets-Sheet 1

INVENTOR.
Maurice Olley
BY
His Attorney

April 17, 1962 M. OLLEY 3,029,901
VEHICLE DRUM BRAKE
Filed Sept. 18, 1959 3 Sheets-Sheet 2

INVENTOR.
Maurice Olley
BY
His Attorney

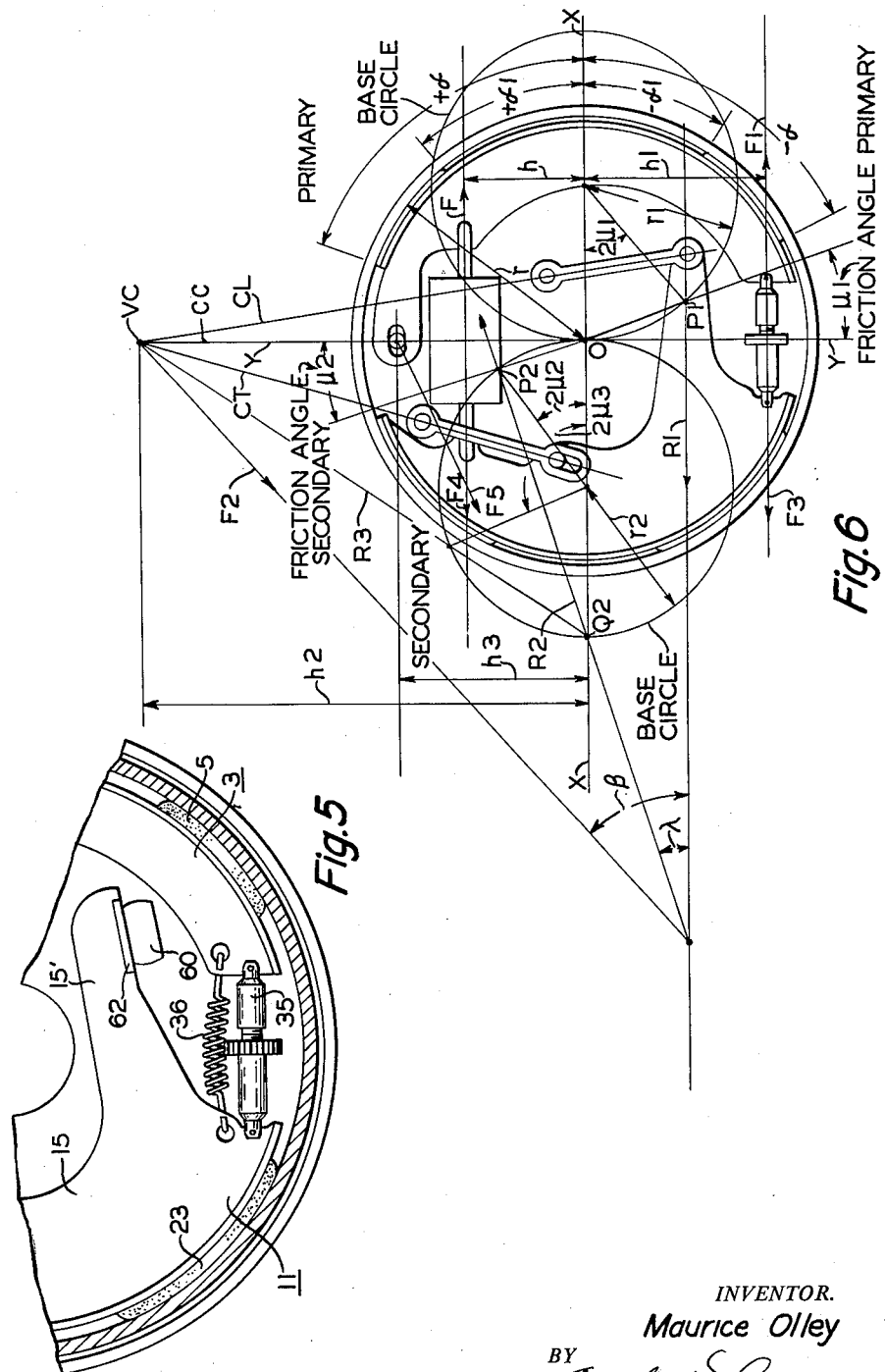

United States Patent Office 3,029,901
Patented Apr. 17, 1962

3,029,901
VEHICLE DRUM BRAKE
Maurice Olley, Pasadena, Calif., assignor, by mesne assignments, to General Motors Corporation, Detroit, Mich., a corporation of Delaware
Filed Sept. 18, 1959, Ser. No. 840,893
12 Claims. (Cl. 188—78)

This invention relates to vehicle drum brakes and more particularly to a brake shoe anchor construction to prevent locking of the brake shoe and drum.

In accordance with this invention the brake shoe is anchored on the backing plate by a linkage located within the brake drum to provide a virtual anchor center, about which the shoe rotates during brake actuation, located outside the brake drum. Thus, the resultant force of the brake shoe on the anchor will, even when the coefficient of friction increases, due for example to dampness, always pass between the center of the drum and the virtual anchor center. Since this resultant force does not pass through or outside the virtual anchor center, the secondary shoe cannot lock with the drum.

This construction is particularly useful in the conventional two shoe servo brake employing a pair of shoes within a brake drum. The shoes are anchored and actuated at the top and connected by a force transmitting strut at the bottom. In these brakes employing the servo energization principle, on the application of the applying force to the upper end of both shoes, the shoes engage the drum and rotate with the drum so that the secondary shoe engages the anchor. The primary shoe performs the dual function of providing braking effect on the drum as well as the major actuating or servo force, transmitted by the strut, to the secondary shoe. The servo force increases with the actuation force and the coefficient of friction and may, with an abnormal increase in the coefficient of friction, increase enough to lock the brake. This occurs when the resultant force of the secondary shoe passes through the anchor pivot point for the secondary shoe. Accordingly, it is proposed to mount the secondary shoe on a linkage connected to the backing plate within the drum providing a virtual anchor center located further from the center of the drum and preferably external of the brake drum to prevent locking of the secondary shoe.

An object of this invention is to provide in a drum brake assembly a pivotally anchored shoe arranged so that the resultant of the forces acting on the anchor will at all times pass between the center of the drum and the point about which the shoe rotates.

It is a further object of this invention to provide a servo energizing vehicle drum brake with anchor means operating in such a manner that the self-energizing force on the secondary shoe is sufficiently limited to prevent locking of the vehicle drum brakes.

It is a further object of this invention to provide a secondary shoe in a servo energizing vehicle drum brake which is pivotally supported and anchored by two links having center lines that intersect at a point forming a virtual anchor center external of the brake drum.

The objects of this invention are accomplished in a vehicle drum brake including a rotating brake drum mounted concentric with a backing plate. Two shoes are disposed within the brake drum for frictionally braking the brake drum. The shoes have cooperatively adjacent ends, two of which are connected by an adjustable strut. The opposite two cooperative adjacent ends are actuated by a hydraulic means. The primary shoe is supported by a pin on its upper end and also by a pin and spring assembly which extends through the webbing of the primary shoe. The secondary shoe is supported by a portion of the anchor linkage and a pin and spring assembly extending through the webbing of the secondary shoe.

The secondary shoe in the preferred version is anchored by two link members. Each link is pivotally mounted on a separate pin supported at spaced points in the backing plate and on a separate pin supported at spaced points on the secondary shoe webbing to locate the pivot center further from the center of the brake than in the conventional brake and preferably at a virtual pivot center located outside the brake drum.

Further objects and advantages of the present invention will be apparent from the following description, reference being had to the accompanying drawings wherein preferred embodiments of the present invention are clearly shown.

In the drawings:

FIGURE 5 is a partial view showing a modification of the anchor linkage.

FIGURE 6 is a diagrammatic view illustrating the brake forces.

Figure 1:
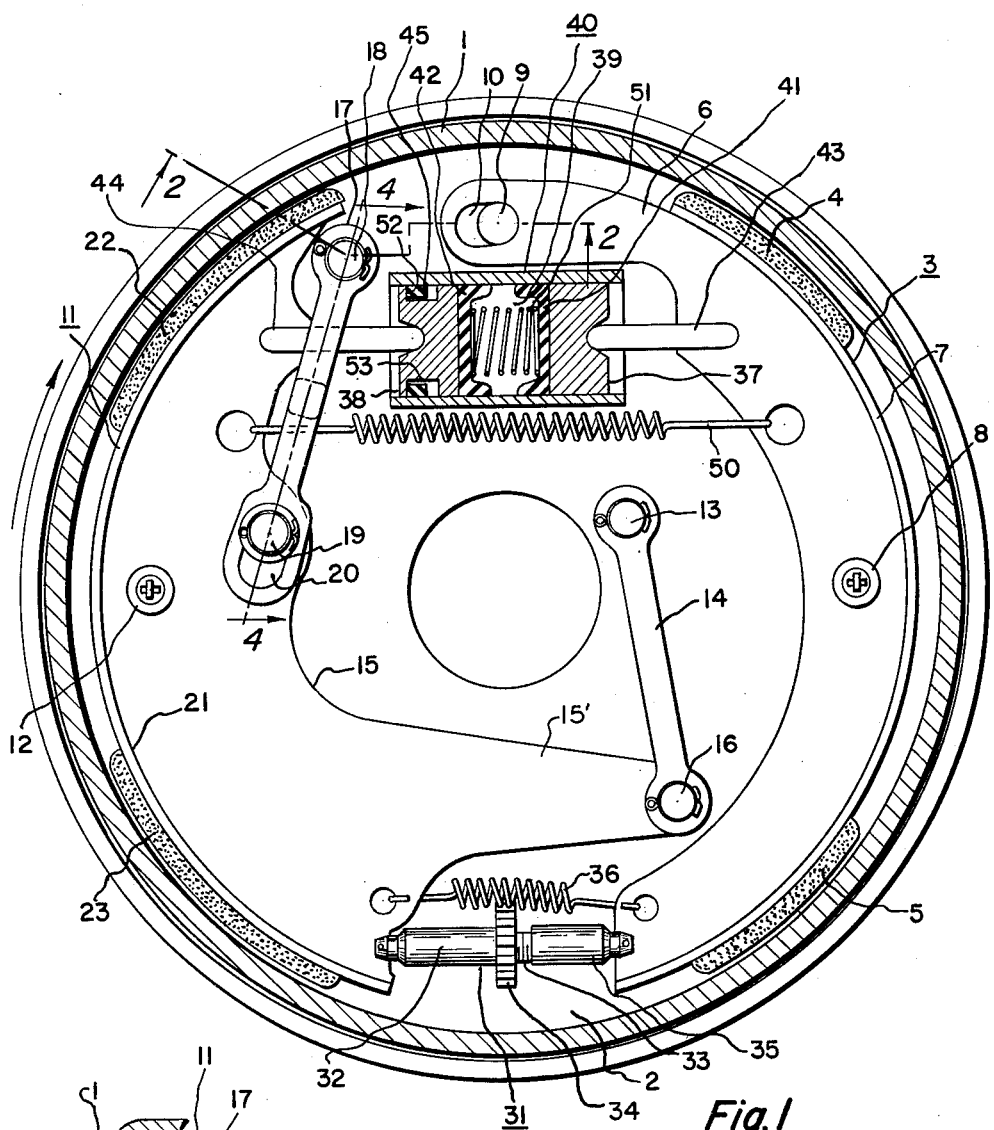
FIGURE 1 is a cross-section view illustrating the vehicle drum brake in the retracted position.

FIGURE 1 illustrates the rotating drum 1 mounted concentric with the backing plate 2. The primary shoe 3 is reinforced with the brake webbing 6 supporting the arcuate flange portion 7 which provides a mounting surface for the frictional material segments 4 and 5. The webbing 6 of the primary shoe 3 is supported on the support pin 9. The webbing 6 has an elongated opening 10 provided within the upper portion of the webbing to permit movement of the primary shoe 3 during the actuation of the vehicle brakes. The primary shoe 3 is also supported by its webbing 6 by means of a conventional pin and spring assembly 8 consisting of a pin universally secured at one end to the backing plate extending freely through an aperture in the brake shoe web and having fixed at the other end a washer compressing a coil spring against the web.

The secondary shoe 11 having a web 15 and a flange 21 is anchored by a pair of links 14 and 17 for rotation about a virtual pivot center further from the center of the brake than the brake shoe flange and preferably a distance equal to the diameter of the drum from the center of the drum. The leading edge or lower link 14 is pivotally mounted at the upper end on the pin 13 secured to the backing plate 2 and pivotally connected to the secondary shoe 11 by a pin 16 secured to an extension 15' of the web 15. The trailing edge or upper link 17 is pivotally mounted at its upper end on the pin 18 secured to the backing plate 2. The lower end of link 17 has an elongated opening 20 receiving the pin 19 fixed to the web 15 to permit pivotal movement during forward braking and sliding movement during reverse braking. The secondary shoe flange 21 carries the friction material segments 22 and 23 which engage the inner periphery of the rotating drum.

Figure 2:
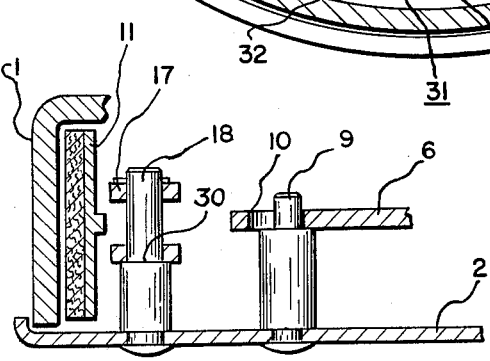
FIGURE 2 is a cross-section view taken on line 2—2 of FIGURE 1.

FIGURE 2, the cross-section view taken on line 2—2 of FIGURE 1, more clearly shows the pin 18 mounted on the backing plate 2 and pivotally supporting the upper link 17.

The secondary brake shoe 11 is shown in cross-section in its retracted position. The support pin 9 is also shown mounted on the backing plate 2 and located in the elongated opening 10 in the primary brake shoe web 6 to permit movement of the primary brake shoe. The primary support pin 9 only operates as an anchor pin for braking when the vehicle wheels are rotating in reverse direction. The pin 9 is located on a vertical line through the center line of the vehicle brake. On the conventional vehicle drum brake the anchor pin is located on this vertical line and operates as an anchor means for both forward and rearward braking.

Figure 4:
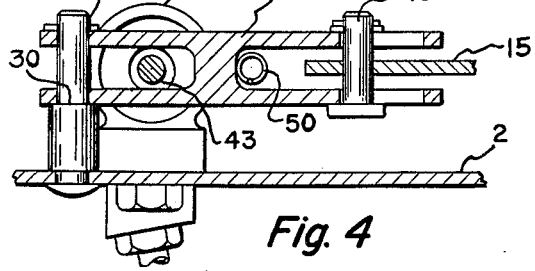
FIGURE 4 is a cross-section view taken on line 4—4 of FIGURE 1 showing the anchor pin and link as well as the hydraulic means supported on the backing plate.

FIGURE 4 illustrates the forked link 17 and the connections with the backing plate and the secondary brake shoe webbing. The pin 18 is fastened to the backing plate 2 and extends into the space within the vehicle brake drum. A shoulder portion 30 is formed on the pin 18 which abuts the side of link 17. The pin 18 extends through the link to provide the pivoting support for the link 17. The link 17 is forked at this end to clear the push rod 43.

The link 17 extends downward and slightly to the left to engage a pin 19. The pin 19 is fixed in the secondary brake shoe webbing 15. The elongated slot 20 in the link 17 provides a means for movement of the secondary brake shoe 11 when the brakes are actuated in reverse. The link 17 at the lower end is forked to permit passage of the retraction spring 50.

The link 17 is mounted on the pin 18 which is placed at a point to the left of the vertical line extending through the center of the braking mechanism. As shown diagrammatically in FIGURE 6, a line CT extending longitudinally through the pivot centers of link 17 forms an angle with the same type center line CL of link 14 and intersects external of the brake drum preferably on the vertical brake center line CC through anchor pin 9. This linkage in effect places an anchor point at the intersection of the line of links 14 and 17 at a point external to the rotating drum. It has been found that, with currently employed moulded commercial linings having a coefficient of friction which varies approximately between .20 to .42 under normal conditions but which may rise under abnormal conditions to .7 and even approach unity, the desirable point at which the longitudinal center line of the link 17 intersects the center line of link 14 is a distance equal to the inner diameter of the rotating brake drum 1 from the center of the brake drum. If this intersecting point is located at a point closer to the center of the braking mechanism, the possibility of locking of the secondary shoe with the rotating drum increases. If the reverse situation is true and the intersecting point is more remote, the possibility for locking of the secondary shoe decreases. A desirable point being as previously mentioned equal to the diameter of the inner periphery of the rotating brake drum from the center of the braking structure.

An adjustable strut 31 is mounted between the cooperative adjacent ends of the brake shoes at the lower portion of the braking mechanism. This adjustable strut 31 includes a sleeve 32 connecting the secondary shoe webbing 15 and having a smooth cylindrical opening on the right-hand end for reception of a smooth cylindrical shank of screw member 33. Screw member 33 is provided with a ratchet wheel 34 as a means for rotating the screw 33. The screw 33 is provided with a threaded portion which is received within an internally threaded opening in the sleeve member 35. The sleeve member 35 engages the webbing 6 of the primary shoe 3. A constant contact is maintained between the primary shoe and the secondary shoe 11 by means of a tension spring 36.

The cooperative adjacent ends on the upper ends of the brake shoes are actuated by means of a hydraulic cylinder 40. The cylinder operates in cooperation with pistons 37 and 38. These two pistons move axially within the cylinder 36. Fluid is pressurized within the chamber 39. A spring 51 is also mounted between the two pistons 37 and 38 to position the seal 41 against piston 37 as well as seal 42 against the piston 38. A push rod 43 is placed between the piston 37 and the primary brake shoe webbing 6. A push rod 44 is placed between the secondary brake shoe webbing 15 and the piston 38.

The hydraulic cylinder 40 receives a friction ring 45 which is mounted in a groove in the outer periphery of piston 38. The friction ring 45 moves axially outward within the hydraulic wheel piston 38 as the friction material on the brake shoes becomes worn. The friction ring serves to center the brake shoes within the rotating drum in the retracted position.

The brake shoes are preferably provided with intermittent lining. It has been found that the intermittent lining provides a more consistent and larger base circle under Acres' theory as explained below resulting in increased self-actuation of the shoes, thus compensating for the reduced servo actuation due to the external pivot center. As the vehicle brake shoes are actuating and the pressure between the friction material and the brake drum increases, the brake drum is deflected and the shoes are distorted. This is a natural condition as it is impossible to construct brake shoes and brake drums which do not change their shape slightly during brake actuation. This distortion causes a change in the operation of the brakes due to a change in the frictional drag between the brake lining and the rotating brake drum. It has been found that the effect of the distortion is minimized and self actuation is increased and more consistent when segmented brake linings as shown are employed.

Figure 3:
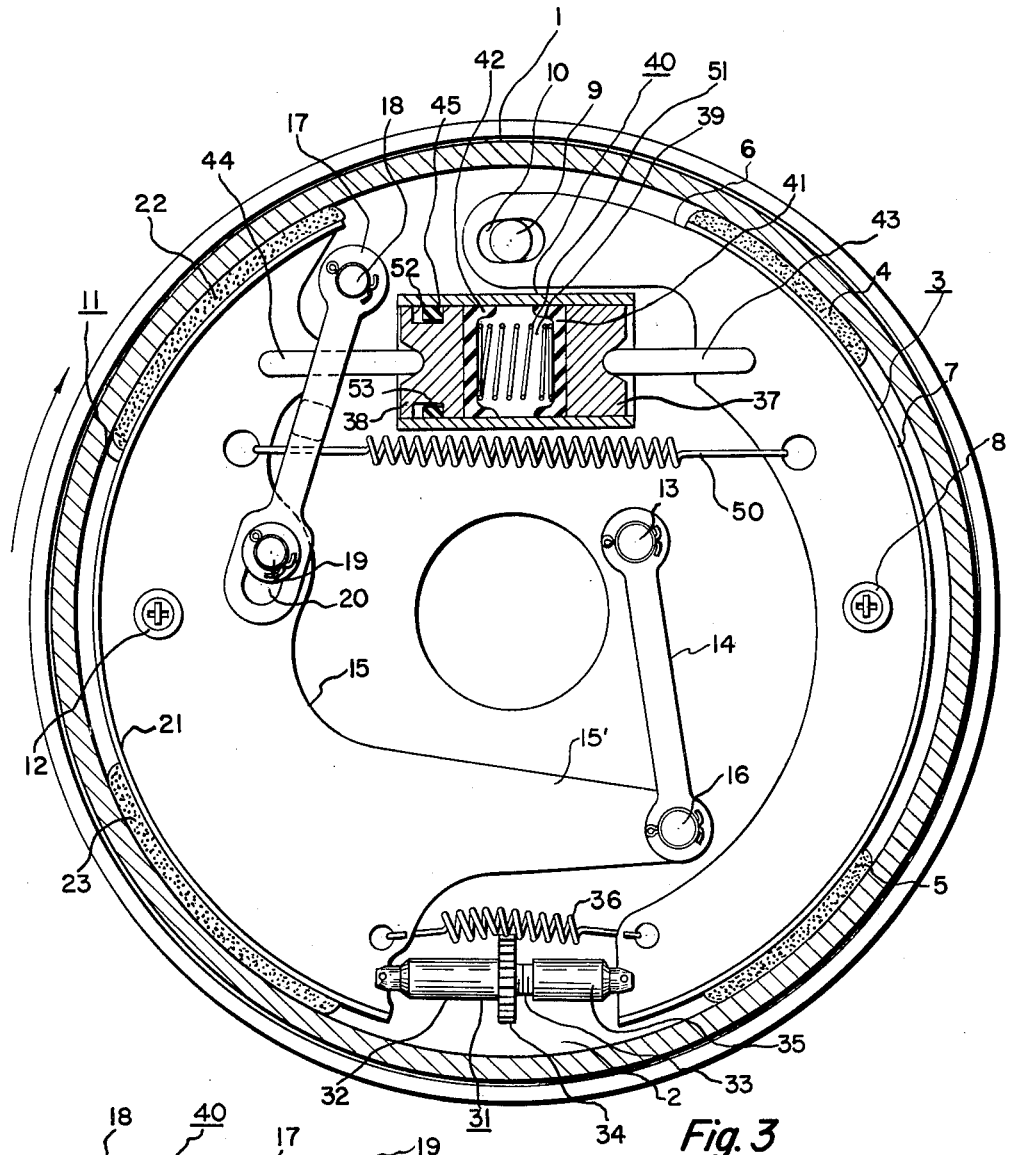
FIGURE 3 is a cross-section view of the vehicle brakes in the actuated position.

This invention operates in the following manner in accordance with a basic theory of brake operation described by F. A. Stepney Acres in his article entitled "Some Problems in the Design of Braking Systems" in vol. 15, No. 2, November 1946, Journal of the Institution of Automobile Engineers, pages 19 to 49, published by the Institution of Automobile Engineers, London, England. As the hydraulic cylinder 40 is actuated by increasing the pressure of the fluid within the chamber 39, the pistons 37 and 38 move axially outward within the cylinder moving push rods 43 and 44 to expand the primary and secondary brake shoes outwardly within the rotating brake drum. As the pressure within the chamber 39 increases, the friction material 4 and 5 of the primary shoe 3 and the friction material 22 and 23 of the secondary shoe 11 frictionally engage the inner periphery of the rotating drum 1. When the vehicle wheels are rotating in a forward direction as indicated by the rotation arrow, the friction material of the brake shoes contacting the inner periphery of the drum 1 will rotate the shoes slightly in the same direction. The shoes will rotate until the pin 19 seats firmly in the upper end of the elongated slot 20 in link 17, and the secondary shoe rotates on the links about the virtual center of rotation VC to the anchored position with both shoes contacting the drum as shown in FIG. 3.

In this position, as shown in FIG. 6 illustrating the direction but not the magnitude of the forces, the primary brake shoe 3 has these forces acting upon it. The spring 36 merely holds strut 31 in place and does not provide an actuating force acting on the shoes. The push rod 43 acts in a horizontal direction to the right, slightly, reduced by retraction spring 50 to provide a force F. The force F and the friction of the rotating drum 1 on the friction material 4 and 5 creates radial and tangential forces, the resultant R1 of which must be a horizontal force equal in magnitude to the sum of the forces F and F1 in cylinder 40 and strut 35. These forces tend to rotate the primary shoe to apply a servo actuating force F3 through the strut to the secondary shoe. The reaction of force F3 or reaction force F1 transmitted by the strut horizontally to the right, force F and the tangential forces apply the primary shoe.

These forces apply the friction material of the semi-rigid primary brake shoe 3 to produce a self-energized braking effect on the rotating drum. The primary brake shoe performs a secondary function in assisting in the actuation of the secondary brake shoe by providing the servo actuating force F3 transmitted through the adjustable strut to the secondary shoe and an apply reaction force F4 which is the reaction to applying force F transmitted through the cylinder.

Thus, the secondary shoe has these forces acting upon it during actuation. The hydraulic cylinder 40 produces an opposite actuating or reaction force F4 on the secondary shoe equal to force F on the primary shoe. The adjustable strut transmits a force F3 from the primary to the secondary shoe. The forces F3 and F4 transmitted by the wheel cylinder and the adjustable strut are parallel and horizontally to the left and are equal to the reaction of the forces on the primary shoe.

The direction of the resultant of these forces, force R1, may be determined by Acres' theory. Assuming that the linings are symmetrical about the horizontal center line and the actuator and strut or forces F and F1 are horizontal, the base circle is drawn with the center on the $x$ axis and a radius for uninterrupted linings $$r1 = \frac{r \sin \alpha}{\alpha + \frac{\sin 2\alpha}{2}}$$

and for interrupted linings $$r1 = \frac{r(\sin \alpha - \sin \alpha 1)}{(\alpha - \alpha 1) + \frac{(\sin 2\alpha - \sin 2\alpha 1)}{2}}$$

where $r1$ is the radius of the primary base circle, $r$ is the radius of the drum, $\alpha$ is the external ½ angles of the lining from the $x$ axis, $\alpha 1$ is the internal ½ angles of the lining from the $x$ axis.

When the friction angle for the primary shoe $\mu 1$ is drawn from the center of the drum O downwardly, it intersects the base circle at the point P1 through which the resultant force R1 acting on the secondary shoe acts. The point P1 may be more accurately graphically located by constructing an angle of $2\mu 1$ from the center of the base circle below the $x$ axis. The resultant force R1 of the primary shoe on the secondary shoe acts through point P1 horizontally. The rotating drum creates tangential forces on the friction material of the secondary brake shoe. Due to the servo energizing principle, the secondary shoe produces most, i.e. 75%, of the braking effect on the rotating drum and the tangential friction forces are greater than on the primary shoe. As the friction forces increase between the friction material on the secondary shoe and the rotating drum, the tangential force tends to rotate the secondary shoe with the rotating drum. These forces, which may be termed the drag on the secondary shoe, produce a resultant force which normally acts in a direction upwardly to the right through a point below the pin 9. The direction of the secondary shoe resultant R2 is determined under Acres' theory by solving the above equations for the radius of the secondary base circle $r2$, constructing the secondary base circle and the angle of friction of the secondary $\mu 2$ in the same manner as described above for the primary shoe. The resultant R2 passes through point Q2 at the intersection of the secondary base cricle and the $x$ axis and point P2. The force F2 acting in opposition to this force is transmitted through the pin 18 and link 17 and pin 13 with link 14 which are connected to the secondary brake shoe webbing 15. The force acting through the link 17 and link 14 is longitudinally through the links and the centers of the two pins 18 and 19 as well as 13 and 16. This linkage provides a virtual center VC about which the secondary shoe rotates at the intersection of the center line CL of the pivots of link 14 and the center line CT of the pivots of link 17. The force F2 extends from this center VC to the intersection of the resultant forces R1 and R2. When the friction angle $\mu 2$ increases, the vertical component of the resultant R2 will increase. The resultant will then pass through Q2 and a new point P2 at an increased angle $\lambda$. Thus, it will be seen that the coefficient of friction or the angle $\mu 2$ can increase substantially, due i.e. to dampness, without the resultant force R2 passing through center VC to provide normal brake operation over a much wider range of the coefficient of friction than in prior constructions. In the brake shown in FIG. 6 having a virtual center VC a distance $h2$ one brake drum diameter from the center of the brake, the brake will lock only when the resultant R3 passes through VC requiring a friction angle of $2\mu 3$ or coefficient of friction of 1.5. Since the maximum coefficient of friction encountered in known brake lining materials approaches 1, the virtual center should be at a distance $h2$ to prevent locking at this value and preferably a distance $h2$ equal to the drum diameter.

In the conventional type of vehicle drum brake where the anchor pin is located at the point of pin $9h3$ from the center, a small increase in the friction angle $\mu 2$ or coefficient of friction to a value of .62 in FIG. 6 or .72 in an actual commercial construction of the secondary shoe, will increase the drag to the point where the angle $\lambda$ of the total force R2 with a horizontal force R1 becomes so great that the force acts through or above the center of pin 9. Under abnormal conditions the coefficient of friction rises to these values causing the secondary brake shoe to lock with the rotating drum.

The pin 9 of the applicant's device does not operate as the anchor pin in forward braking. The resultant force R2 to lock the secondary shoe as shown must pass through or above the center VC formed by the intersection of the center lines CL and CT of links 14 and 17. This point VC, the virtual anchor center, is located external of the brake drum and thus prevents locking under substantially all coefficients encountered in brake operation.

Since this brake with the center of rotation VC of the secondary shoe moved further away from the resultant force R1 acting on this shoe reduces the self-energization of this shoe and thus the total braking effect of the brake, it has been found desirable to compensate for this. This reduction in self-energization occurs because the force R1 acts on a longer lever arm about the new virtual center VC than in conventional brakes employing a center of rotation for the secondary shoe at pin 9. When interrupted linings are employed the shoe factor (circumferential drag divided by applying force) increases due to an increased self-energizing effect which increases the magnitude of the resultant force R1. This is illustrated by Acres' theory by the fact that the diameter of the base circle is increased when interrupted linings are employed. This brake provides a brake factor substantially the same as the conventional brake discussed above over the normal range of the coefficient of friction from fade at .2 to .4 and continues to rise almost linearly to .7 when plotted with a logarithmic scale for the brake factor. However, the brake factor of the conventional brake rises exponentially approching infinity. This causes locking.

As the vehicle brakes are released, the pressure within the fluid chamber 39 of the cylinder 36 is reduced. As the pressure becomes reduced sufficiently, the retraction spring 50 overcomes the force of the residual pressure and the cylinder spring 51 and moves the brake shoe and pistons inward at the hydraulic cylinder 36. The primary shoe moves inward from the rotating drum until the right-hand side of the elongated slot 10 rests on the pin 9. The primary shoe is supported on pin 9. The secondary shoe is supported by link 14 and moves inward until the surface 52 in the annular recess 53 of the piston 38 rests against the friction ring 45. The pin 19 on web 15 of the secondary shoe is held against the upper end of slot 20 in link 17. In this position with the diameter of the shoe assembly reduced, the friction material on the brake shoes is in spaced relation from the rotating drum 1. The spring and pin assemblies 8 and 12 prevent swinging movement of the two shoes which would cause contact with the drum.

When the brakes are applied during rearward or reverse movement of the vehicle, the brake operates in an opposite manner with the pin 9 acting as the anchor pivot pin. The secondary shoe 11 acts as a primary shoe to create the servo energizing force transmitted through strut 35 to the primary shoe 3, now acting as a secondary shoe which pivots and is anchored by pin 9. The pin 19 on secondary shoe 11 moves freely in slot 20 so that the link 17 does not affect the movement of this shoe. The link 14 does not materially interfere with the operation of the secondary shoe 11 in reverse operation. On release of the brakes the shoes return to the retracted position as explained above so there is no click of pin 19 in slot 20 on a subsequent forward brake application.

FIGURE 6 illustrated a modified linkage which may be employed to obtain the same type of brake operation. Instead of mounting the leading edge of the secondary shoe on a link 14, it is mounted on a flat cam 60 secured to the backing plate 2. The web extension 15' of the secondary shoe has a flat cam 62 engaging cam 60 so that a point equivalent to the center of pin 16 moves in a straight line tangent to the arc of movement of the pin 16 at the mid-point of movement. Since the movement is small this will closely approximate the movement provided by link 14 and provide substantially the same virtual pivot center VC. It will be appreciated that the cam surface 60 could be curved to provide the same motion as link 14.

While the embodiments of the present invention as herein disclosed constitute a preferred form, it is to be understood that other forms might be adopted.

What is claimed is as follows:

1. A vehicle drum brake comprising in combination, a rotating brake drum, a backing plate mounted adjacent to said rotating drum, a primary and a secondary shoe mounted within said brake drum for frictionally engaging the inner periphery of said brake drum, said brake shoes having cooperative adjacent ends, a strut positioned between two of said cooperative adjacent ends of said brake shoes, means for actuating and frictionally engaging said two brake shoes with said brake drum, said actuating means positioned between the opposite two cooperative adjacent ends and said brake shoes, retraction means for retracting said brake shoes from frictional engagement with said rotating brake drum, a lower link pivotally mounted on said backing plate and pivotally connecting said secondary shoe, an upper link pivotally mounted on said backing plate and pivotally engaging said secondary shoe, said upper link pivotally mounted on said backing plate at a point located radially external of said brake actuating means and in lateral spaced relation toward the secondary shoe from a vertical center line through said brake drum, said upper link and said lower link having center lines coincidental with anchor forces intersecting to form a virtual anchor center external of said brake drum located in a position to prevent locking of said secondary shoe.

2. A vehicle drum brake comprising in combination, a rotating brake drum, backing plate mounted concentric with and in spaced relation to said rotating brake drum, a primary and a secondary shoe mounted within for frictional engagement with said rotating brake drum and having cooperative adjacent ends, a strut mounted between two of said cooperative adjacent ends of said brake shoes, a brake actuating means mounted between said opposite two cooperative adjacent ends of said brake shoes, a retraction means connected to said two brake shoes for retracting said brake shoes from frictional engagement with said rotating brake drum, an anchor means mounted on said backing plate and pivotally connecting said secondary shoe and including, an upper link pivotally mounted on said backing plate and pivotally connecting said secondary shoe at its midsection, pivoting means mounted on said backing plate and pivotally supporting said upper link at a point adjacent the brake drum on a radial line forming an angle of approximately 15° with a diametrical vertical center line through the brake drum, a lower link, pivoting means on said backing plate pivotally supporting said lower link, said lower link connected to said secondary shoe at the leading edge of said secondary shoe, said upper link and said lower link having longitudinal axes intersecting to form a virtual anchor point removed externally from said brake drum.

3. A vehicle drum brake comprising in combination, a rotating brake drum, a backing plate in spaced relation to said rotating brake drum, a primary and a secondary shoe mounted for frictional engagement with said rotating brake drum, said brake shoes having cooperative adjacent ends, a connecting strut between two of said cooperative adjacent ends, an actuating means between said opposite two cooperative adjacent ends, retraction means for retraction of said brake shoes from frictional engagement with said brake drums, an anchor means mounted on said backing plate for supporting said secondary shoe including, a first anchor link, a second anchor link, an anchor pin, said first anchor link pivotally connected to the midsection of said secondary shoe and said anchor pin, said anchor pin located adjacent the trailing end of said secondary brake shoe positioning said first anchor link in such a manner that the longitudinal axis of said link and an anchor force intersects the center line and a second anchor force of said second link at a point external of said brake drum to provide a means for eliminating locking of said secondary shoe with said rotating brake drum.

4. A vehicle drum brake comprising in combination, a rotating brake drum, a backing plate mounted in spaced relation to said brake drum, a primary and a secondary brake shoe mounted within for frictional engagement of said rotating brake drum, said brake shoes having cooperative adjacent ends, strut means for connecting two of said cooperative adjacent ends, actuating means positioned between said two opposite cooperative adjacent ends of said brake shoes, means for retracting said brake shoes from engagement with said brake drum, a first link pivotally mounted on said backing plate and connecting said secondary shoe, the axis of said first link intersecting an extension of the vertical diametral axis of said brake external of said drum, a second link pivotally mounted on said backing plate and pivotally connecting said secondary shoe at approximately its midsection, the axis of said second link intersecting said extension of said diametral axis external of said drum, said second link pivotally mounted on said backing plate at a point adjacent the trailing edge of said secondary shoe in such a manner that the longitudinal axis of said link and anchor force intersects the center line and anchor force of said first link at a point external of said brake drum, thereby providing a means for reception of the brake torque to prevent locking of said secondary shoe with said rotating brake drum.

5. A vehicle drum brake comprising in combination, a rotating brake drum, a backing plate in spaced relation with said rotating brake drum, a primary shoe and a secondary shoe mounted within said rotating brake drum for frictional engagement of said brake drum, said brake shoes having cooperative adjacent ends, one end of said primary brake shoe pivotally supported on its upper end, strut means for connecting the opposite cooperative end of said primary shoe with a cooperative end of said secondary shoe, said cooperative end of said secondary shoe including an arm extending toward said primary shoe, actuating means positioned between the first mentioned end of said primary brake shoe and the cooperative adjacent end of said secondary shoe, retraction means for retracting said brake shoes from frictional engagement from said rotating brake drum, said actuating means including a wheel cylinder having two oppositely acting pistons for expanding said brake shoes, one of said pistons having an annular depression for reception of a friction ring about the inner periphery of said hydraulic cylinder, said friction ring aiding centering of said brake shoes within said rotating brake drum when said brake shoes are in their retracted position, a first link pivotally mounted on the central portion of said backing plate and pivotally connecting with said arm on said secondary brake shoe, a second link pivotally mounted on said backing plate to pivotally connect said secondary shoe at a point in the intermediate section of said secondary brake shoe, said second link being pivotally located on said backing plate adjacent the trailing edge of said secondary brake shoe positioning said second link in such a manner that the longitudinal axis of said link intersects the center line of said first link at a point approximately the distance of the diameter of said brake drum from the center of said brake drum to provide an anchor means transmitting a force through said intersection of said link axes to prevent locking of said secondary shoe with said rotating brake drum.

6. A vehicle drum brake comprising in combination, a rotating brake drum, a backing plate mounted adjacent to said rotating brake drum, a primary and a secondary shoe mounted for frictional engagement with the inner periphery of said rotating brake drum, said brake shoes having cooperative adjacent ends, strut means connecting two of said cooperative adjacent ends of said brake shoes, said secondary shoe having an arm adjacent said strut means extending toward said primary shoe, a hydraulic actuating means between the opposite two cooperative adjacent ends of said brake shoes, means for retracting said brake shoes from frictional engagement with the inner periphery of said rotating brake drum, a first link pivotally mounted on a first anchor pin on said backing plate and pivotally connected to a midpoint on said secondary shoe, a second link pivotally mounted on said backing plate and pivotally connecting with said arm on said secondary shoe, said first anchor pin located adjacent to the trailing edge of said secondary brake shoe positioning said first link in such a manner that the longitudinal axis of said first link intersects the center line of said second link forming a virtual anchor at a point approximately the distance of the diameter of said brake drum from the center line of said brake drum to provide a means for receiving the brake torque of said vehicle drum brake and prevent a locking of said secondary shoe with said rotating brake drum.

7. A vehicle drum brake comprising in combination: a rotating brake drum, a support mounted adjacent to said rotating brake drum, two brake shoes mounted within said rotating brake drum for frictionally engaging the internal surface of said rotating brake drum, said brake shoes having cooperative adjacent ends, means at two of said cooperative ends of the brake shoes to transfer a force from one shoe to the other, means for actuating said brake shoes between the opposite two cooperative adjacent ends of said brake shoes, means for retracting said brake shoes from said brake drum, linkage means connecting one of said brake shoes to said support for anchoring said one of said brake shoes, said linkage including a first link pivotally connected to the midsection of said shoe and pivotally mounted on said backing plate, a second link pivotally connecting said shoe and pivotally mounted on said backing plate on the opposite side of a vertical diametral axis from said first link, said linkage means to provide an anchor means having a virtual center of rotation external of said drum about which said one brake shoe rotates during brake engagement to prevent locking of said anchored shoe with said rotating drum.

8. A vehicle drum brake comprising in combination: a rotating brake drum, a support mounted adjacent to said rotating brake drum, a secondary brake shoe mounted within said rotating brake drum having a friction surface for frictionally engaging the internal surface of said rotating brake drum on both sides of a first diametral axis of said brake, means for actuating said secondary brake shoe including a primary brake shoe which on engagement with said drum transmits a force to said secondary brake shoe on one side of said first diametral axis, linkage means for anchoring said secondary brake shoe including, a first member and a second member pivotally connected to said shoe and said backing plate and located on opposite sides of a second diametral axis perpendicular to said first diametral axis to provide an anchor means having a virtual center external of said drum on the other side of said first diametral axis to prevent locking of said anchored shoe with said rotating drum.

9. A vehicle drum brake comprising in combination, a rotating brake drum, a backing plate mounted adjacent to and concentric with said rotating brake drum, two brake shoes mounted within said rotating brake drum for frictionally engaging said rotating brake drum, said brake shoes having cooperative adjacent ends, a strut mounted between two of said cooperative adjacent ends of said brake shoes, a means for actuating said brake shoes between the opposite two cooperative adjacent ends of said brake shoes, means for retracting said brake shoes from said brake drum, means for supporting and anchoring one of said brake shoes including, a first link pivotally connected to the midsection of said one brake shoe, pivoting means for mounting said first link on said backing plate adjacent to the trailing edge of said one brake shoe with the pivoting support end of said link positioned closer to a vertical diametral axis of said brake than the pivoting connection to the midsection of said brake shoe, a second link, an arm extending transversely from the leading edge of said one brake shoe to form a pivoting connection to said second link, pivoting means pivotally connecting said second link to said backing plate in a position adjacent to the center of said backing plate, said second link positioned with the pivoting connection to said backing plate at a position closer to the diametral vertical axis than the pivoting connection to said arm of said brake shoe, the longitudinal center of said first link and said second link intersecting at a point forming a virtual center removed from said brake drum to which the anchor forces of said one brake shoe are directed to prevent locking of said brake shoe when said brakes are actuated.

10. A vehicle drum brake comprising in combination, a rotating brake drum, a backing plate mounted concentrically adjacent to said rotating brake drum, a primary and a secondary brake shoe mounted within said rotating brake drum for frictionally engaging the inner periphery of said drum, said brake shoes having cooperative adjacent ends, a strut positioned between and connected to two cooperative adjacent ends of said brake shoes, means for actuating and frictionally engaging said brake shoes with said rotating drum positioned between the opposite two cooperative adjacent ends of said brake shoes, means for retracting said brake shoes from said brake drum, a link means for supporting and anchoring one of said brake shoes, said link means including a first link pivotally connected to a midsection of said one brake shoe, a pivotal means connecting the opposite end of said first link to said backing plate in a position adjacent to the trailing edge of said one brake shoe, a second link pivotally connecting the leading edge of said one brake shoe, pivoting means pivotally connecting said second link adjacent the center portion of said backing plate, said first link and said second link having a longitudinal axis coincidental with the anchoring forces of said one brake shoe intersecting at a point forming an anchor center external of said brake drum.

11. A vehicle drum brake comprising in combination, a rotating brake drum, a backing plate mounted adjacent to said rotating brake drum, a primary and a secondary brake shoe mounted within said rotating drum for frictionally engaging said rotating drum and having cooperative adjacent ends, a strut positioned between two of said cooperative adjacent ends of said brake shoes, and actuating means positioned between the opposite two cooperative adjacent ends of said brake shoes, means for retracting said brake shoes from said brake drum, a linkage means providing an anchor for one of said brake shoes, said anchor means including a first link pivotally connected to said one brake shoe, anchor means pivotally connecting said first link at a point adjacent to the trailing edge of said one brake shoe, a second link pivotally connected to the leading edge of said one brake shoe, pivoting means pivotally mounting said second link at a point adjacent to the center portion of said backing plate, said first link and said second link having longitudinal axes coincidental with the forces transmitted for anchoring of said brake shoe and intersecting at a point forming a virtual center external of said brake drum to prevent locking of said brake shoe with said drum when said vehicle brakes are actuated.

12. A vehicle drum brake comprising in combination, a rotating brake drum, a backing plate in spaced relation to said rotating brake drum, a primary and a secondary brake shoe positioned within said brake drum for frictionally engaging said rotating brake drum, said brake shoes having cooperative adjacent ends, a strut positioned between two of said cooperative adjacent ends of said brake shoes, actuating means and retraction means positioned between the opposite two cooperative adjacent ends of said brake shoes, a linkage means for anchoring said secondary shoe including, a first link pivotally connected to the midsection of said secondary brake shoe, pivoting means pivotally connecting said first link to said backing plate at a point adjacent to the trailing edge of said brake shoe, the longitudinal axis of said first link forming an acute angle with an extension of the diametral vertical axis of said brake drum external of said brake drum, a second link pivotally connecting the leading edge of said one brake shoe, pivoting means pivotally connecting said second link at a point adjacent to the center portion of said backing plate, said second link having a longitudinal axis forming an acute angle with an extension of said vertical diametral axis of said brake drum, said first link and second link having longitudinal axes coincidental with the anchoring force of said secondary shoe and intersecting at a point external of said brake drum to prevent locking said brake shoe when said vehicle brakes are actuated.

References Cited in the file of this patent

UNITED STATES PATENTS

| | | |
|---|---|---|
| 1,886,811 | Huck | Nov. 8, 1932 |
| 2,131,369 | Brisson | Sept. 27, 1938 |
| 2,237,650 | Brisson | Apr. 8, 1941 |
| 2,651,384 | Brisson | Sept. 8, 1953 |